United States Patent

[11] 3,625,253

| | | |
|---|---|---|
| [72] | Inventor | Kurt Christiansen<br>Oberbuchsiten, Switzerland |
| [21] | Appl. No. | 881,159 |
| [22] | Filed | Dec. 1, 1969 |
| [45] | Patented | Dec. 7, 1971 |
| [73] | Assignee | Firma Von Roll AG<br>Gerlafingen, Switzerland |
| [32] | Priority | Dec. 5, 1968 |
| [33] | | Switzerland |
| [31] | | 18204/68 |

[54] HYDRAULIC UNIT
6 Claims, 3 Drawing Figs.

[52] U.S. Cl. .................................... 137/652.21,
91/485, 91/499
[51] Int. Cl. .................................... F16k 11/02
[50] Field of Search .................................... 91/485,
499, 503; 137/625.21

[56] References Cited
UNITED STATES PATENTS
2,809,594  10/1957  Orshansky.................... 91/485
2,972,962  2/1961   Douglas....................... 91/485
3,059,432  10/1962  Thoma........................ 91/485 X

*Primary Examiner*—Henry T. Klinksiek
*Attorney*—Werner W. Kleeman

ABSTRACT: A hydraulic unit is disclosed having a rotating cylinder block in which a plurality of pistons move within axial cylinders, and a stationary control surface controlling the flow of fluid to and from the cylinders. A portion of the pressurized control fluid is taken from the fluid supply and is fed to a fluid thrust bearing means surrounding the control surface, which fluid bearing permits substantially frictionless rotation of the cylinder block relative to the control surface. The fluid bearing preferably comprises a plurality of circumferentially spaced pockets in the surface of the control body facing the cylinder block annularly disposed outside the control surface, the pockets being connected in communication with one another by short, relatively fine passageways. A suitable check valve means is inserted between the source of fluid supply and the thrust bearing so that pressurized fluid cannot return to the fluid supply and thus adversely affect control of the flow of fluid in the cylinders.

PATENTED DEC 7 1971 3,625,253
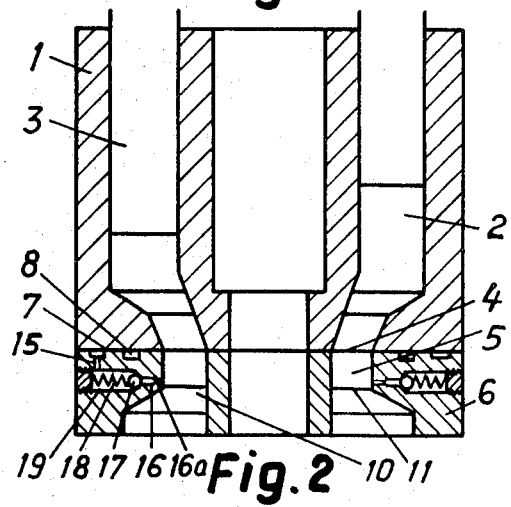
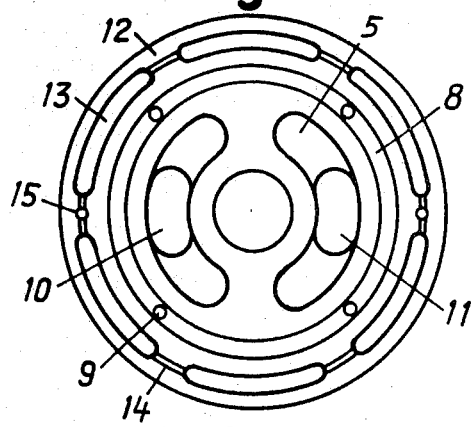
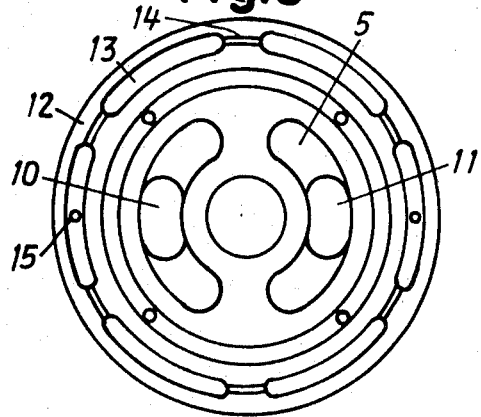
INVENTOR
KURT CHRISTIANSEN
BY Jacobi, Davidson & Kleeman
ATTORNEYS 3,625,253

HYDRAULIC UNIT

BACKGROUND OF THE INVENTION

This invention relates to a new and improved hydraulic unit such as a fluid motor or pump, having a rotating cylinder block and a stationary control surface, which is disposed upon the surface of a control body member which controls the infeed and discharge of a suitable fluid medium to and from the cylinder block. The control surface has control slots which are in turn surrounded by an annular hydrostatic thrust bearing forming air bearing means, which bearing comprises pockets which are impacted or pressurized by the operating fluid medium. Hydraulic units of an axial or radial construction, having a rotating cylinder block and a stationary thrust bearing which surrounds a stationary control surface, are already known to the art. Such a thrust bearing either comprises a plurality of isolated pockets which are individually supplied with separate infeed conduits for throttled high-pressure fluid medium, or a plurality of recesses or indentations of any desired shape which are in communication with one another by connecting grooves or channels, in which case, this embodiment exhibits, in addition, a discharge conduit which is in a connecting relation with the momentary low-pressure side of the unit. In the case of such known thrust bearings which are known to the art, the fabrication of these units is relatively expensive, and/or the dimensioning thereof is rendered difficult, because of the pressure conditions which are effected in irregular manner by the influence of the discharge conduit and must, therefore, be determined on the basis of each individual set of operating conditions.

SUMMARY OF THE INVENTION

With the above background in mind, it is therefore an object of the present invention to provide a hydraulic unit which overcomes the above disadvantages of the prior art.

Specifically, it is a primary object of the present invention to provide such a hydraulic unit which comprises in the control surface thereof a fluid thrust bearing which can be economically produced.

It is a further object of the invention to provide such a hydraulic unit in which the thrust bearing thereof can be easily dimensioned.

It is yet a further object of the invention to provide such a hydraulic unit having a fluid thrust bearing, the fluid supply and discharge means for which bearing do not adversely affect the fluid operation of the hydraulic unit.

These, as well as other objects which will become apparent as the description proceeds, are implemented by the present invention characterized by a hydraulic unit having a fluid thrust bearing comprising a plurality of interconnected fluid pockets on the high-pressure side of the hydrostatic thrust bearing as well as the low-pressure side thereof, and having infeed channel means in connecting relationship with the high-pressure side in such a manner that the fluid pockets disposed in respective semicircles in either direction from the infeed means are impacted substantially simultaneously by means of the infeed channel means.

BRIEF DESCRIPTION OF THE DRAWINGS

The invention itself will be better understood and additional advantages and features thereof will become apparent, from the following detailed description of a preferred embodiment of the invention, taken in conjunction with the accompanying drawing, in which:

FIG. 1 is a schematic sectional view through a rotating cylinder block of an axial piston unit and an associated control body for the infeed and discharge of the fluid pressure medium, constructed according to the invention;

FIG. 2 is a top plan view of the control surface of a first embodiment of the invention; and FIG. 3 depicts a top plan view of a slightly modified control surface.

DETAILED DESCRIPTION OF A PREFERRED EMBODIMENT OF THE INVENTION

The expression "hydraulic unit," as used hereinunder, refers to an axial or radial-piston unit which operates as either a hydraulic pump or hydraulic motor, the cylinder block of which unit rotates and which unit possesses, in place of valves, a distributor means, herein referred to as a control surface, which serves to control the infeed and discharge of the fluid pressure medium. The control surface comprises essentially a pair of slots for the high-pressure side and the low-pressure side, respectively, of the unit, across which slots slide the control bores of the individual cylinders of the rotating cylinder block. Due to the movement of the pistons in the cylinders, the fluid pressure medium is drawn in from one control slot and discharged into the other control slot.

Referring to the drawing, reference numeral 1 denotes the rotating cylinder block of an axial piston unit, which cylinder block exhibits a plurality of cylinder bores 2, two of which are shown in this embodiment, and in each of which a respective piston 3 is axially moved to and for cylinder block 1 is rotatably mounted by suitable nonillustrated means. At the forward side surface of the cylinder block 1 is disposed a control bore 4 for each of the cylinder bores 2, the cross section of the control bore 4 being round, oval, or slot-shaped, as being advantageous in each case. The radial width of each such control bore 4, corresponds approximately to the radial width of control slots 5 in the control body 6 which will be hereinunder described more fully.

Cylinder block 1 is a rotatably supported upon control body 6, also known as a valve plate, in the surface 7 of which control body are machined the two control slots 5 which are preferably disposed in symmetrical fashion about the transverse axis of the control surface. Reference numeral 8 denotes an annular groove which is provided with discharge openings 9 and which groove limits and defines the outer periphery of the actual control surface. A pair of channels 10 and 11, which serve the infeed and discharge of the fluid pressure medium, are disposed within control body 6. Radially outwardly from groove 8 is disposed a thrust bearing denoted as 12 which essentially comprises an annular surface into which are machined a plurality of circumferentially spaced pockets or recesses 13, which pockets are serially or sequentially connected to each other by means of short and relatively fine circumferential connecting grooves 14. Preferably, as shown, an even number of such pockets 13 are provided, disposed within a pair of opposing semicircles symmetrically to either side of a transverse axis of symmetry of the control surface and spaced equally about the circumference thereof.

The admission of pressurized fluid within thrust bearing 12 occurs by means of high-pressure axial infeed bore or channel 15 which, as can be seen from FIG. 1, communicates with the infeed and discharge channels 10 and 11 by means of a radially extending bore having a large diameter portion 19 and a small diameter or throttled portion 16a merging with the bore portion 16 through which radial bore the fluid pressure medium passes from control slot 5 into the infeed bore 15. Between large diameter portion 19 and bore portion 16 of the radial bore there is provided a nonreturn valve, which may preferably comprise a ball 17 and a spring 18, and which prevents the return flow of fluid from the radial bore and the thrust bearing 12 into the control bore 5. As illustrated in FIG. 2, infeed bore 15 opens into a connecting groove 14 between two consecutive pockets 13; alternately, as shown in FIG. 3, infeed bore 15 may open directly into one of the pockets 13. Preferably a pair of such infeed bores are disposed at diametrically opposed locations. From this discharge location of infeed bore 15, the fluid pressure medium flows circumferentially in both directions and successively impacts or pressurizes pockets 13 of each of the semicircles extending from the bore 15 or about the thrust bearing 12. On the opposite side of the bearing from the infeed bore 15, the portions of the fluid pressure medium flowing in opposite circumferential directions again come together. However, the fluid pressure medium cannot flow back into control slot 5 at this point, since it is prevented from doing so by the provision of the nonreturn valve 17, 18. The high pressure at this time, thus pressurizes all of the pockets 13 of the thrust bearing 12, including those on the low side of the bearing, substantially simultaneously. Through the buildup of pressure within thrust bearing 12, the cylinder block 1 is thus lifted away from control surface 7, thus forming a fluid lubrication gap between control surface 7 of the control body 6 and the forward face cylinder block 1, which lubrication gap prevents the two opposing surfaces from heating up. By proper dimensioning of the pockets 13 and/or the amount of throttling in the infeed conduits 15, 16, 19 for the fluid pressure medium, the formation of the lubrication gap can be regulated in such manner that, on the one hand, not too much fluid pressure medium flows in, and, on the other hand, no overheating of the two sliding opposing surfaces occurs. The control surface 7 does not need to be constructed, as shown in FIG. 1, as planar, but may, on the other hand, be constructed in spherical, convex, or concave configuration. It is, however, essential that all of the pockets 13 are pressurized only by means of fluid pressure medium from the high-pressure side of the thrust bearing 12 and that no return flow occurs from the low-pressure side to the control bores 5.

It is believed evident that by the provision of a hydraulic unit according to the above detailed description, all of the objects set forth at the outset to the specification have been successfully fulfilled.

What is claimed is:

1. A hydraulic unit of the type having a high-pressure side and a low-pressure side, comprising a control body and a cylinder block rotatable with respect to said control body, said control body having a control surface disposed thereon facing said cylinder block and having fluid control slots communicating with said cylinder block to control the flow of fluid to and from said cylinder block, said control surface being surrounded by an annular fluid thrust bearing, said thrust bearing comprising a plurality of circumferentially spaced fluid pockets facing said cylinder block about the periphery of said bearing in a pair of opposing semicircles, infeed channel means comprising a pair of diametrically opposed infeed channels communicating with said control surface, means for serially interconnecting each of said fluid pockets with one another so that all of said fluid pockets are sequentially in fluid flow connection with one another, and with an infeed channel carrying pressurized fluid, in order to sequentially and substantially simultaneously pressurized the corresponding fluid pockets within each of said semicircles both at high-pressure side and the low-pressure side of the hydraulic unit.

2. A hydraulic unit as defined in claim 1, wherein each of said infeed channels has mounted therein a nonreturn valve means for permitting flow of fluid to said control surface and preventing the return flow of fluid from said control surface.

3. A hydraulic unit as defined in claim 1, wherein each of said infeed channel means includes a reduced diameter throttling portion.

4. A hydraulic unit as defined in claim 3, wherein an even number of said pockets are provided spaced at equal distances about the periphery of said control surface and symmetrically with respect to a transverse axis thereof.

5. A hydraulic unit as defined in claim 1, wherein each of said infeed channel means open into a given one of said pockets.

6. A hydraulic unit as defined in claim 1, wherein said means for placing said fluid pockets sequentially in fluid flow connection with one another comprises respective connecting grooves between each two neighboring pockets, each of said infeed channels opening into a given respective one of said connecting grooves between a respective pair of neighboring pockets.

* * * * *